Patented Dec. 29, 1942

2,306,676

UNITED STATES PATENT OFFICE 2,306,676

ALLOY

Samuel Turkus, East Orange, N. J., assignor to American Smelting and Refining Company, New York, N. Y., a corporation of New Jersey No Drawing. Application June 6, 1942, Serial No. 446,111

1 Claim. (Cl. 75—166)

This invention relates to lead alloys and more particularly to lead-tin-bismuth-silver alloys.

| Composition approx. per cent | | | | | Liquidus °C. | Tensile strength psi | Elongation (2 in.) | Bond strength lap joint psi | | Spread ½ gm. on cu. sq. in. |
|---|---|---|---|---|---|---|---|---|---|---|
| Pb | Sn | Ag | Bi | Sb | | | | Copper | Steel | |
| | | | | | | | Percent | | | |
| 87.50 | 10 | 1.5 | 0.5 | 0.5 | 290 | 5335 | 11.5 | 4830 | 4430 | .26 |
| 82.75 | 15 | 1.25 | 0.5 | 0.5 | 278 | 6180 | 11.5 | 5038 | 4950 | .30 |
| 77.75 | 20 | 1.25 | 0.5 | 0.5 | 270 | 6840 | 14.0 | 5400 | 4960 | .36 |
| 76.75 | 20 | 1.25 | 1.5 | 0.5 | 268 | 6720 | 13.0 | 5340 | 4800 | .38 |
| 67.75 | 30 | 1.25 | 0.5 | 0.5 | 248 | 7625 | 15.0 | 5800 | 5200 | .79 |

The alloys of the present invention are especially useful as solders but they may be utilized for other purposes where it is desired to employ an alloy having the physical characteristics of the metals hereinafter described. The present application is a continuation in part of my prior application Serial No. 430,804, filed February 13, 1942.

Alloys composed of lead-tin-bismuth and lead-silver have been compounded and used as solders, but the physical properties of these alloys are not comparable with the ordinary lead-tin solders. I have discovered, however, after considerable experimentation, that a novel and highly useful alloy can be made composed of lead, tin, bismuth and silver. Using certain proportionate amounts of these elements, alloys are formed which are particularly valuable as solders. I have also found that the tin content of my new alloy can be considerably decreased as compared with conventional solder composition without adversely affecting the requisite soldering properties.

My invention, broadly speaking, consists in the provision of quaternary alloys of lead, tin, bismuth and silver and similar compositions comprising this quaternary base alloy with the addition of small amounts of other constituents which impart further desired properties thereto or enhance the beneficial characteristics possessed by said base alloy.

One of the principal objects of the present invention is to provide a lead alloy solder which is comparable in working and physical properties with the conventional lead-tin solders but contains decidedly less percentage amounts of tin.

Other objects and advantages of this invention will become apparent as the description proceeds.

In the following table there is listed some of the salient physical characteristics of the alloys of my invention which have been determined.

As shown in the table, the quaternary alloys of lead-tin-bismuth and silver contain small percentage amounts of antimony. From 0.25% to 3% of antimony may be present or added, particularly where high tensile strength is desired. A large number of specific alloy compositions comprising lead, tin, bismuth and silver may be made, depending upon the use for which the alloy is intended, by varying the percentage amounts of the constituents. By appropriate adjustment of the tin, bismuth and silver contents, fairly wide ranges of melting points and other properties can be obtained.

The amount of tin may be reduced below 10% but the melting point range is increased and the melted solder is slightly less fluid. While the preferred alloy compositions are stated in the table, I have found that percentage amounts of the ingredients may be varied within a fairly broad range. For example, the alloy composition may comprise from 5% to 40% tin, 0.3 to 5% bismuth, 0.5% to 5.0% silver, and from 0.25% to 3% antimony with the balance of the composition being substantially all lead.

From the data given, it will be readily apparent that the alloys of this invention possess and exhibit properties which make them suitable for various uses other than solders, and such other uses are contemplated within the scope of this invention as defined by the appended claim.

What is claimed is:

A relatively low melting point alloy composition which consists principally of lead, tin, bismuth and silver, said constituents approximating from 5% to 40% tin, 0.3% to 5% bismuth, 0.5% to 5.0% silver, 0.25% to 3% antimony, with the balance of the alloy composition being made up substantially all of lead.

SAMUEL TURKUS.